2,496,344

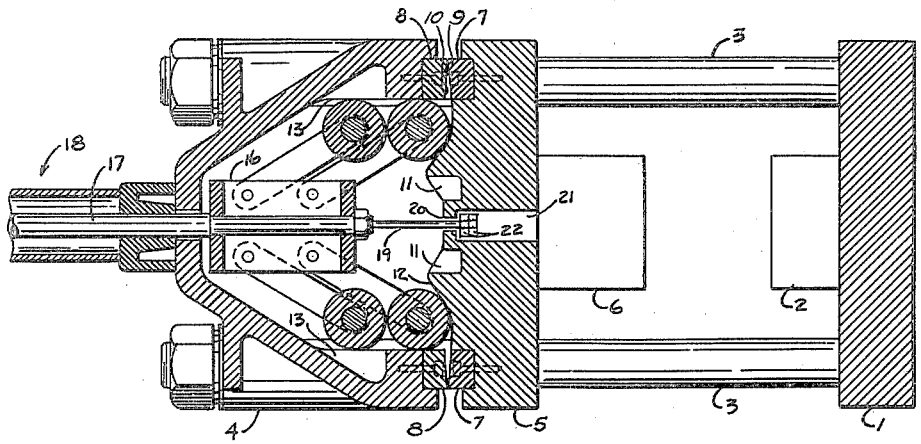
Fig. I
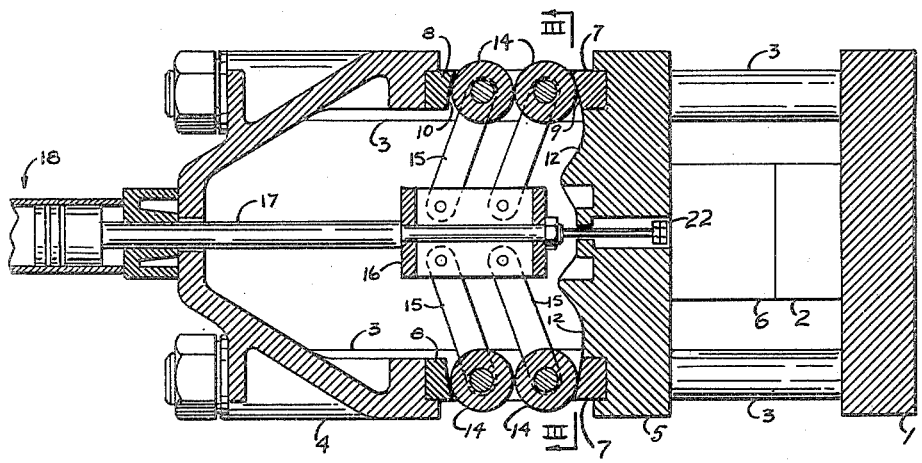
Fig. II
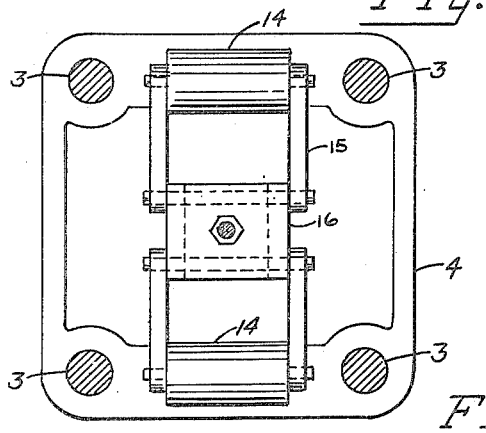
Fig. III
INVENTOR.
KEITH W. HALL
BY Marshall and Marshall
ATTORNEYS Patented Feb. 7, 1950

UNITED STATES PATENT OFFICE 2,496,344

FORCE MULTIPLYING MECHANISM

Keith W. Hall, Toledo, Ohio, assignor, by mesne assignments, to The Baldwin Locomotive Works, a corporation of Pennsylvania Application July 10, 1947, Serial No. 759,983

10 Claims. (Cl. 74—110)

This invention relates to force multiplying mechanism and in particular to a toggle mechanism having very low friction and consequently high efficiency.

While a toggle mechanism theoretically has an almost infinite force multiplication as the toggle links approach alignment, it is nevertheless impossible to realize this high multiplication ratio because of the friction in the joints of the toggle which friction resists movement of the toggle links.

The principal object of this invention is to provide a mechanism that incorporates some of the principles of a toggle mechanism and which carries the load forces on rolling surfaces so that there are no load carrying surfaces subject to sliding friction.

Another object of the invention is to provide a mechanism that moves a movable member through the greater portion of its stroke at a relatively rapid rate and that moves the member through the remainder of its stroke at a slow rate but with greatly increased force.

These and other objects and advantages are attained in the improved toggle mechanism, a preferred embodiment of which is illustrated in the accompanying drawing.

The structure embodying the invention is applicable to a press for mechanically applying pressure and consists of a fixed member, a guided relatively movable member, opposing surfaces on the fixed and movable members that are inclined at a small angle from a line perpendicular to the path of movement of the movable member, and a pair of rollers that are guided to roll each between the other and one of the inclined surfaces whereby the rolling of the rollers on the inclined surfaces produces movement of the movable member with respect to the fixed member.

The fixed member may be the head of a press, a fixed abutment of an injection molding machine, a vise frame or any similar structure. The guided movable member may be one of the platens of a press, a die support for an injection molding machine, the movable jaw of a vise or any similar member that is to be forced into contact with a work piece. These members each have inclined surfaces which may be either plane or curved and arranged so that when a pair of rollers are rolled into the space between the surfaces the members are wedged apart.

A preferred embodiment of the invention is illustrated in the accompanying drawing in which:

Figure I is a longitudinal section through a press incorporating the improved toggle mechanism with the platen of the press shown in its retracted position.

Figure II is a section similar to Figure I except that the platen is in its advanced or pressure applying position.

Figure III is a transverse section taken along the line III—III of Figure II.

These specific figures and the accompanying description are intended merely to illustrate the invention but not to impose limitations on the claims.

In a press embodying the invention a base 1 that may serve as a support for a die 2 has a plurality of tie rods 3 extending therefrom and secured to a head or fixed member 4. A platen 5 serving as a support for a die 6 that cooperates with the die 2 is slidably mounted on the tie rods 3 so that it constitutes a guided relatively movable member. Hardened steel inserts 7 and 8 are set in opposing surfaces of the head or fixed member 4 and the movable member 5. The hardened steel inserts 7 and 8 have their juxtaposed surfaces 9 and 10 inclined at a small angle from a line perpendicular to the length of the tie rods 3, i. e. perpendicular to the path of movement of the movable member or platen 5. The surface of the platen 5 facing the fixed member 4 has raised portions 11, the surfaces of which provide cam tracks 12 that lead onto the inclined surfaces 9 of the inserts 7.

In cross section the fixed member 4 is generally U-shaped in form with the open portion of the U-shaped section facing the movable member 5 and with the inserts 8 set in the ends of the legs of the U-shaped section. The interior surfaces of the U-shaped section provide parallel cam tracks 13 that lead to the sides of the inserts 8 adjacent the inclined surfaces 10. Two pair of hardened steel rollers 14 are provided and are connected by means of swingable links 15 to a box-like frame 16 that is mounted on the end of a piston rod 17 of a hydraulic cylinder 18.

At the start of the stroke when the members are in the position shown in Figure I force from the hydraulic cylinder 18 is transmitted through the links 15 and rollers 14 to the cam tracks 12 so that the platen 5 is urged away from the fixed member 4. During the initial and greater part of the stroke the rollers 14 are guided by the parallel cam tracks 13 so that the platen 5 is moved through the same distance and at the same velocity as the movement of the piston of the hydraulic cylinder 18. Toward the end of the stroke when the members approach the position shown in Figure II the training ones of the rollers 14 move around the corners of the inserts 8 so that the rollers enter the space between the inclined opposing surfaces of the inserts 7 and 8. The remainder of the stroke of the platen 5 is effected by the wedging action of the rollers 14 as they roll on the inclined surfaces 9 and 10. Since the rollers are of equal diameter and the links 15 are of equal length the rollers are maintained in alignment so that force is transmitted from the insert 7 across the diameter of the first roller to the second roller and across its diameter to the insert 8 that is set in the fixed member 4.

As the rollers wedge their way into the space between the inclined surfaces 9 and 10, each of the rollers rolls on the cooperating roller and on one of the inclined surfaces. In this manner the wedging action of the toggle mechanism is accomplished without any sliding of the surfaces that carry the load forces exerted by the platen 5. The elimination of all sliding load carrying surfaces permits an enormous force multiplication to be efficiently obtained. The efficiency of this structure is sufficient so that the force applied by the platen 5 may be closely estimated by the hydraulic pressure applied to the hydraulic cylinder 18. The opposing surfaces 9 and 10 of the inserts 7 and 8 may be either plane or curved. If the surfaces are plane the force multiplication from the hydraulic cylinder to the platen increases as the links approach the horizontal. For stability it is necessary to limit the travel of the piston rod to the position shown. If the piston travels further, a point is reached where the rate of change of force multiplication equals or exceeds the elastic constant of the press structure. At such a point or beyond it pressure exerted by the platen no longer is proportional to the hydraulic pressure and may even increase with a decrease in hydraulic pressure as the piston moves downwardly.

To avoid this instability the faces of the inserts 7 and 8 may be made concave such that their shapes at the points of contact with the rollers 14 increases as fast as the mechanical advantage of the toggle increases. In this manner constant force multiplication is obtained.

It is also possible, when the characteristics of the material being worked is known, to shape the insert surfaces 9 and 10 so that for normal hydraulic pressure in the cylinder 18 the force at the platen is just sufficient to do the work. In this manner the throttling loss in the valves to the cylinder is avoided and more efficient operation attained.

The rollers 14 are effective only in driving the platen 5 away from the fixed member 4. It is therefore necessary to provide auxiliary mechanism to retract the platen 5 on the return stroke of the driving member 16. Any suitable mechanism may be employed for this purpose, a very convenient mechanism being a lost motion connection from the piston rod 17 of the hydraulic cylinder 18 to the platen 5. This lost motion connection may consist of an extension 19 of the piston rod 17 that, passing through a small hole 20 in the adjacent face of the platen 5, enters a larger diameter hole 21. A pair of nuts 22 locked on the end of the extension 19 engage the end of the hole 21 adjacent the small hole 20 when the driving member 16 is retracted. In most press operations the platen 5 retracts a small distance because of the resiliency of the load and then remains stationary until the rollers are completely withdrawn from the space between the opposed inclined surfaces 9 and 10 at which time the nuts 22 engage the end of the hole 21 and draw the platen 5 to its retracted position. The thickness of the platen 5 is sufficient so that the extension 19 and nuts 22 do not interfere with the die 6 attached to the face of the platen 5.

While the improved toggle mechanism is illustrated as embodied in a press, it is equally applicable wherever a high force multiplication is required.

Various modifications incorporating the rolling action of guided rollers for exerting a large force may be made without departing from the spirit and scope of the invention.

Having described the invention, I claim:

1. In a press for mechanically applying pressure, in combination, a fixed member, a guided relatively movable member, opposing surfaces on the fixed and movable members which surfaces are inclined toward each other at generally equal angles from a line perpendicular to the path of movement of the movable member, and a pair of rollers that are guided to roll each between the other and one of the inclined surfaces whereby the rolling of the rollers on the inclined surfaces produces movement of the movable member with respect to the fixed member.

2. In a press for mechanically applying pressure, in combination, a fixed member, a guided relatively movable member, opposing surfaces on the fixed and movable members which surfaces are inclined toward each other at selected generally equal angles from a line perpendicular to the path of movement of the movable member, a pair of rollers that are guided to roll each between the other and one of the inclined surfaces, a driving member, and means for operatively connecting the rollers to the driving member.

3. In a press for mechanically applying pressure, in combination, a fixed member, a guided relatively movable member, a plurality of pairs of opposing surfaces on the fixed and movable members which surfaces are inclined toward each other at generally equal angles from a line perpendicular to the path of movement of the movable member, and a pair of rollers for each of the pairs of opposing surfaces, each roller of each pair being guided to roll between the other roller of the pair and one of the inclined surfaces cooperating with the pair of rollers.

4. In a press for mechanically applying pressure, in combination, a fixed member, a guided relatively movable member, a plurality of pairs of opposing surfaces on the fixed and movable members which surfaces are inclined toward each other at generally equal angles from a line perpendicular to the path of movement of the movable member, a pair of rollers for each of the pairs of opposing surfaces, each roller of each pair being adapted to roll between the other roller of the pair and one of the inclined surfaces, a driving member and means for connecting the driving member to the rolls.

5. In a press for mechanically applying pressure, in combination, a fixed member, a guided relatively movable member, a plurality of pairs of opposing surfaces on the fixed and movable members which surfaces are inclined toward each other at small generally equal angles from a line perpendicular to the path of movement of the movable member, a pair of rollers for each of the pairs of opposing surfaces, each roller of each pair being adapted to roll between the other roller of the pair and one of the inclined surfaces, a driving member that is movable along a path extending in the same direction as the path of the movable member, and a plurality of links for individually connecting the rollers to the driving member, whereby movement of the driving member rolls the rollers on the inclined surfaces.

6. In a press for mechanically applying pressure, in combination, a fixed member, a guided relatively movable member, a plurality of pairs of cam tracks on the members, each of the cam tracks having a portion that is inclined at a small angle from a line perpendicular to the path of movement of the movable member, a pair of rollers for each pair of cam tracks, a driving member that is movable in the same direction as the movable member, links connecting the rollers to the driving member, the cam tracks on the fixed member having portions extending parallel to the path of the driving member, said driving member being adapted to apply force through the links and rollers to drive the movable member through the greater portion of its stroke while the rollers slide on the parallel cam tracks and to drive the movable member through the last portion of its stroke by rolling the rollers on the inclined surfaces with each roller rolling between the other roller of the pair and one of the inclined surfaces.

7. A mechanism according to claim 6 including a lost motion connection between the driving member and the movable member for retracting the movable member.

8. In a press for mechanically applying pressure, in combination, a fixed member, a guided relatively movable member, a driving member movable in the same direction as said guided member, opposed cam tracks on the fixed and guided members, a plurality of rollers arranged in pairs each roller of each pair engaging one of the cam tracks and the other roller of the pair, and struts connecting the rollers individually to the driving member, said cam tracks being inclined from a line perpendicular to the path of the guided member at angles that progressively increase with distance from the path of the driving member.

9. In a press for mechanically applying pressure, in combination, a fixed member, a guided relatively movable member, opposed surfaces on the fixed and movable members, said surfaces being curved and inclined toward each other in generally equal amounts from a line perpendicular to the path of the movable member, a pair of rollers insertable between the opposed surfaces each contacting the other roller and one of the surfaces, and a drive mechanism having a variable mechanical advantage for driving said rollers into the space between the surfaces.

10. In a press for mechanically applying pressure, in combination, a fixed member, a guided relatively movable member, opposed surfaces on the fixed and movable members, said surfaces being curved and inclined toward each other in generally equal amounts from a line perpendicular to the path of the movable member, a pair of rollers insertable between the opposed surfaces each contacting the other roller and one of the surfaces, and a drive mechanism that has a mechanical advantage that varies throughout its stroke and that is generally directly proportional to the inclination of the surface element in contact with the rollers for driving the rollers into the space between the surfaces.

KEITH W. HALL.

REFERENCES CITED

The following references are of record in the file of this patent:

UNITED STATES PATENTS

| Number | Name | Date |
|---|---|---|
| 2,371,547 | Rosenlund et al. | Mar. 13, 1945 |

FOREIGN PATENTS

| Number | Country | Date |
|---|---|---|
| 82,870 | Germany | Jan. 22, 1895 |

Certificate of Correction

Patent No. 2,496,344                                              February 7, 1950

KEITH W. HALL

It is hereby certified that error appears in the printed specification of the above numbered patent requiring correction as follows:

Column 2, line 55, for the word "training" read *trailing*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*